Jan. 5, 1960 H. C. SIMONS 2,919,907
COMBINATION HEATER AND AIR CONDITIONER UNIT
Filed Feb. 21, 1955 2 Sheets-Sheet 1

INVENTOR.
HOMER C. SIMONS

BY
ATTORNEYS

Jan. 5, 1960   H. C. SIMONS   2,919,907
COMBINATION HEATER AND AIR CONDITIONER UNIT
Filed Feb. 21, 1955   2 Sheets-Sheet 2

INVENTOR.
HOMER C. SIMONS
BY
ATTORNEYS

United States Patent Office 2,919,907
Patented Jan. 5, 1960

2,919,907
COMBINATION HEATER AND AIR CONDITIONER UNIT

Homer C. Simons, South Euclid, Ohio, assignor to Eaton Manufacturing Company, Cleveland, Ohio, a corporation of Ohio Application February 21, 1955, Serial No. 489,394

10 Claims. (Cl. 257—294)

This invention relates to a passenger vehicle accessory and more particularly to an apparatus for providing air to an automobile tonneau that is conditioned for both human health and comfort with particular reference to temperature, humidity, and cleanliness.

Broadly the present invention comprehends the provision of a refrigeration apparatus for receiving air from a ventilating and heating system of an automobile and for conditioning or cooling and dehumidifying the same before discharge into the tonneau.

It is often found very desirable particularly in regions of extreme climates to maintain atmospheric conditions within the tonneau of passenger vehicles more conducive to the health and comfort of the passengers therein. In the past many structures have been devised for accomplishing this result but they have been in large measure prohibitively expensive, complicated, ineffective, or inefficient in use so that little use has been made thereof.

To be practical, an automobile air conditioning apparatus must meet rather stringent requirements. Units must be effective at all engine speeds to provide relatively rapid cooling and often for prolonged periods of time at a minimum of power drain, must be relatively light in weight, compact for limited installation spaces, and must be capable of withstanding and operating under comparatively sudden changes in weather conditions. Along with these qualifications, a satisfactory unit must also be simple enough of manufacture as to make it inexpensive in initial cost, installation and maintenance and must further constitute an attractive automobile accessory.

Accordingly it is an object of this invention to provide an automobile air conditioning apparatus that is simple, inexpensive, compact of construction, light in weight, inexpensive of maintenance, efficient and effective in operation.

It is another object of this invention to provide an automobile air conditioning apparatus that is readily adaptable to and installed in an automobile having a heating system therein.

It is another object of this invention to provide an automobile air conditioning apparatus that is effective over prolonged periods of operation at all automobile engine speeds.

It is a further object of this invention to provide an automobile air conditioning apparatus that employs novel features and combinations of features enabling utilization thereof in an existing automobile heating system.

Still other objects and advantages of this invention will become apparent from a perusal of the following detailed description when considered with the accompanying drawings in which.

Figure 1:
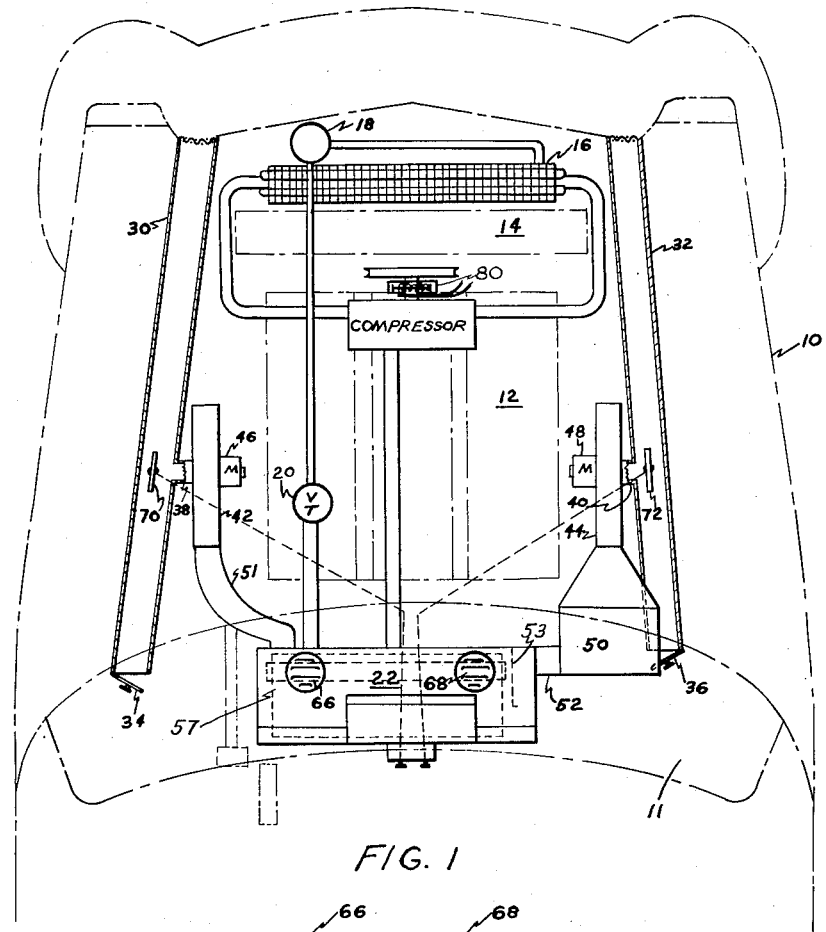
Fig. 1 is a plan view of the entire invention as incorporated in an automobile vehicle.

In the present disclosure, the connotation given to terms such as "air conditioner" and "air conditioning" is the popular one, viz., that of treating air to cool the same and incidentally to dehumidify the same to some extent, rather than a precise or literal connotation.

The present invention comprises an air conditioning apparatus incorporated in the heating system of an automobile to provide a combination heater-air conditioner apparatus. Additions and minor modifications are made to the existing heating system so as to enable the heating system to operate as before the addition and to enable the operation of the air conditioner when desired. In the heating system of the automobile considered, a pair of ventilating ducts receive fresh air from the front of the automobile and extend to the automobile tonneau for the discharge of air thereinto. Provision is made in the right hand duct for extracting air therefrom by a T-junction at a point intermediate its length for delivery of air to a heater for heating thereof and subsequent delivery to the tonneau. Provision is also made in the right hand duct for controlling the admission of fresh air, the recirculation of tonneau air, and for recirculating tonneau air in any ratio to fresh air.

In accordance with the present invention, a refrigeration system of generally conventional structure including a compressor, condenser, expansion valve, evaporator, etc., is provided for operational drive by the automotive engine. A housing containing an evaporator core therein is substituted for the normal plenum chamber and is placed under the dash board against the firewall within the tonneau and air from the T-branch on the left and from the heater on the right is conducted to the housing. The heater is modified to discharge air only to the housing. The air received in the housing either passes directly therefrom through an opening therein as when the system operates as a heater or passes through the evaporator core and into the tonneau through another opening as when the system operates as an air conditioner. A suitable damper door controls selectively the flow of air through either of the discharge openings of the housing.

Air for heating then enters the heater intake from the duct T-junction on the right hand side either as fresh air or as recirculated air, passes through the heater core, into the housing and is discharged therefrom through the hot air discharge opening. Air for air conditioning enters the housing from the respective T-junctions as either fresh or recirculated air, passes directly from the left hand T-junction into the housing and from the right hand T-junction through the heater into the housing. In the case of air conditioning, the heater core, of course, is not heated.

As another feature of this invention, an electromagnetic clutch is provided for coupling the compressor drive to the automobile engine and control means for the clutch enable engagement or disengagement of the clutch as a simple and effective control of the operation of the air conditioner. The dimensions of the pulleys on the compressor and the engine drive are so dimensioned as to provide a compressor speed equal to 1.05 engine speed.

Referring now more particularly to Fig. 1 of the drawings for a detailed description of the present invention, 10 represents the outline of the body of an automobile to which the present invention is applied and 12 represents an engine for providing the automotive power. A radiator 14 for extracting heat from an engine coolant in a well-known manner is provided in conventional position ahead of the engine 12.

Figure 2:
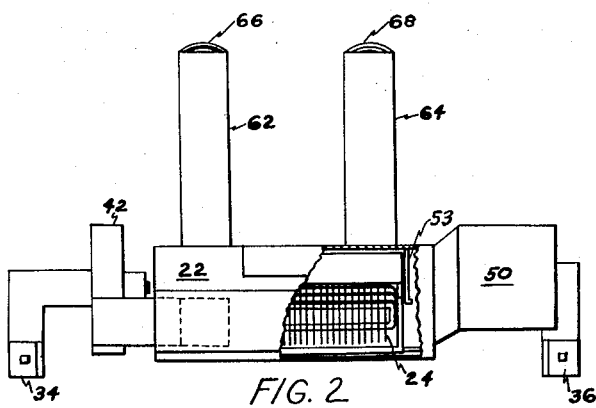
Fig. 2 is a front view of the heater unit and cooler unit sub-assembly.

A refrigeration system of the vapor-compression type is mounted under the hood of the automobile in the engine compartment and includes a compressor, a condenser 16, a refrigerant storage tank 18, an expansion valve 20, a housing 22 having an evaporator core 24 shown more clearly in Fig. 2, and associated conduit connections. The refrigeration system operates in a well-known manner to transfer heat from the evaporator core to the condenser where relatively cool air absorbs the heat therefrom. The compressor is driven by a suitable coupling to the crankshaft of engine 12 as by a belt and pulley arrangement and a magnetic clutch is interposed in the mentioned coupling and is controllable for full coupling or full release to provide a refrigeration control.

A pair of symmetrical ventilation ducts 30 and 32 are provided and extend from the automobile front to the tonneau where a pair of doors 34 and 36 control the discharge of air from the respective ducts. At points intermediate their lengths, ducts 30 and 32 have connected thereto branch ducts 38 and 40, respectively, through a pair of T-junctions. A pair of blowers 42 and 44 driven, respectively, by a pair of motors 46 and 48, are provided to receive air from respective branch ducts 38, 40 and to force air therefrom into housing 22 and into a heater unit 50, respectively. The air discharged into housing 22 passes through a duct 51 and air discharged into heater unit 50 passes through a heater core and is discharged from the heater into housing 22 by way of a duct 52. A suitable baffle 53 is provided for preventing passage of the air discharged into the housing, from duct 52, from passing directly through evaporator core 24.

Figure 3:
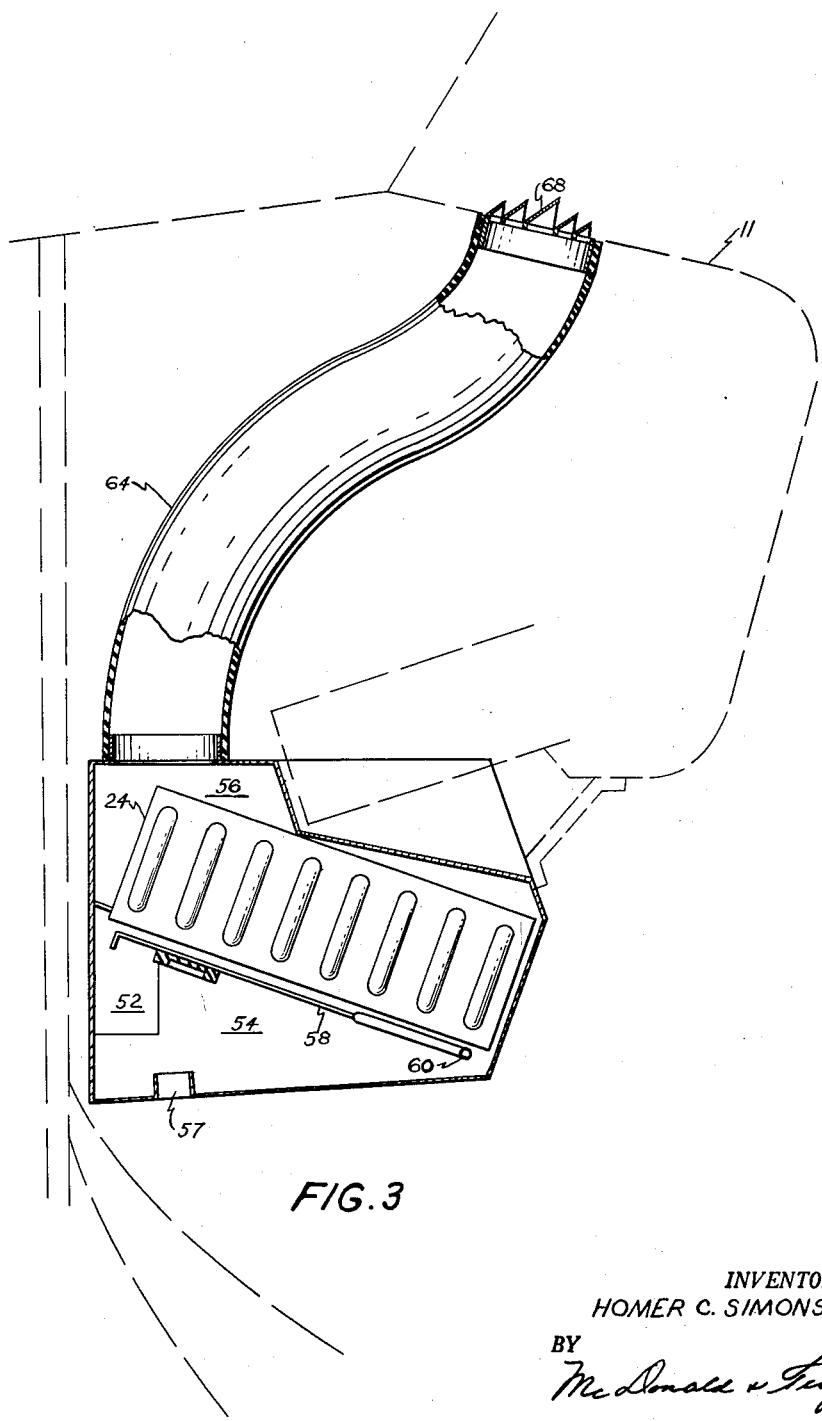
Fig. 3 is a side view of the sub-assembly shown in Fig. 2.

Housing 22 shown in detail in Figures 2 and 3 has mounted transversely therein evaporator core 24 to effect a division of the housing 22 into a pair of volumetric chambers 54 and 56. Lower chamber 54 has an elongated vent 57 along the bottom side of housing 22 and a damper 58 pivoted about a hinge 60 is adapted to cover vent 57 in its lowermost position to stop the flow of air therethrough and in its uppermost position to abut the bottom surface area of evaporator core 24 and thus stop the flow of air therethrough. Accordingly, air entering chamber 54 may be directed in its exit through either vent 57 or core 24 depending, of course, upon the position of damper 58. The discharge of air, of course, need not be exclusively through a single one of the passages mentioned but may, if desired, be apportioned in any suitable ratio between the two passages. Most practically, however, it will be desirable to maintain damper 58 in one of its extreme positions for reasons to become apparent.

Upper chamber 56 of housing 22 receives air passed through core 24 and discharges the same therefrom through a pair of symmetrically located ducts 62 and 64 extending upwardly from housing 22 through the automobile dash board 11. A pair of louvers 66 and 68 for directing the air discharge are provided at the ends of ducts 62 and 64.

A pair of dampers 70 and 72 are provided at the respective T-junctions in ducts 30 and 32 and are centrally pivotal to enable selective and exclusive communication between either the forward or rearward end of the ventilation ducts 30 and 32 with the respective branch ducts 38 and 40 to provide for either fresh or recirculating air for the heater or evaporator. Also in intermediate positions, the dampers facilitate communication between the branch ducts and both ends of the associated ventilation ducts.

An electromagnetic clutch means 80 of any suitable kind is provided in the coupling from the engine to the compressor and circuit means, not shown, are provided for engaging or disengaging the clutch.

Each damper 70 and 72 is controlled in positioning from the tonneau by a mechanical linkage shown to enable selection of fresh air, tonneau air or air of any proportions of fresh and tonneau air for either the evaporator or heater. Controls for the refrigeration are conventional and are therefore not shown.

While the present invention has been described and illustrated with respect to certain specific embodiments thereof, it is obvious that various changes and modifications may be made without departing from the spirit or scope of the invention and it is intended that all matter contained in the above description or shown in the accompanying drawings shall be interpreted as illustrative and not in a limiting sense.

What I claim is:

1. In combination, a vehicle having a passenger compartment, heating and cooling apparatus including a pair of ventilating ducts having a discharge opening in said passenger compartment, a heater adapted to heat air passed therethrough, a refrigeration system including an air discharge housing located in said passenger compartment, an evaporator core disposed in said housing, a branch duct providing communication between said heater and an intermediate point of one of said ventilating ducts, a second branch duct providing communication between said housing and an intermediate point of the other of said ventilating ducts, means providing communication between said heater and said housing, said housing having a pair of discharge openings in the walls thereof, a damper door for selectively obstructing the passage of air through one of said openings and simultaneously unobstructing the passage of air through the other of said openings, air control means in each of said ventilating ducts to provide for passage of either fresh air or passenger compartment air through said branch ducts and control means for selectively activating either said evaporator core or said heater to obtain desirable atmospheric conditions in said passenger compartment.

2. In combination, a vehicle having an enclosed passenger compartment, a heater unit adapted to heat air passed therethrough, a cooler adapted to absorb heat from air passed therethrough, located in said compartment, a duct extending from said cooler to said heater, a second duct extending from an air source to said cooler and a third duct extending from an air source to said heater, said cooler having a pair of discharge openings and a damper for controlling the flow of air through said openings, control means regulating the flow of air in said ducts and for selectively activating said heater and cooler to provide desirable atmospheric conditions in said compartment.

3. A vehicle heater-air conditioner combination comprising a pair of air ducts adapted to receive fresh air at one intake end thereof and to discharge air at the other discharge end thereof, a pair of branch duct means for receiving air from a point intermediate the ends of each of said air ducts, a heater adapted to heat air passed therethrough communicating with one of said branch ducts, a cooler unit adapted to absorb heat from air passed therethrough communicating with the other of said branch ducts, means for selectively providing either fresh air or recirculated air to said heater and said cooler unit, means providing communication between said heater and said cooler unit, said cooler having a pair of discharge openings and a damper for selectively providing communication between one of the other of said discharge openings and both of said branch ducts.

4. A vehicle heater-air conditioner combination according to claim 3 wherein said cooler includes a housing having an evaporator core arranged therein disposed transversely thereacross between one of said discharge openings and the other of said discharge openings.

5. A vehicle heater-air conditioner combination according to claim 3 wherein said means for selectively providing either fresh air or recirculated air to said heater and said cooler unit comprises a louver in each of said ducts at the point of juncture of said branch ducts therewith, said louvers being adapted to provide and control communication between said branch ducts and either of the intake or discharge ends of said air ducts.

6. A vehicle heater-air conditioner combination according to claim 5 additionally comprising control means for said heater and said cooler for selectively providing heated or cooled air from one of said cooler unit discharge ports.

7. An air conditioning system for a vehicle having a motor and a passenger compartment comprising a heater unit adapted to heat air passed therethrough, a cooler unit adapted to absorb heat from air passed therethrough, located in said passenger compartment, means selectively providing air communication between either ambient space or said passenger compartment and each of said heater and cooler units, further means providing air communication between said heater and said cooler, a pair of air discharge openings in said cooler unit separated by an evaporator core, control means for providing communication between either of said discharge openings and ambient space or said passenger compartment.

8. In a vehicle having a motor and a passenger compartment comprising a heater and a refrigeration system including a compressor driven by said motor, a condenser and an evaporator unit located within said tonneau, means providing passage of refrigerant between components of said refrigeration system, ventilation ducts extending from ambient space into said tonneau, one of said ducts being connected to said heater for the discharge of air thereinto, the other of said ducts being connected to said evaporator unit for the discharge of air thereinto, a duct connected between said heater and said evaporator unit for the discharge of air from said heater into said evaporator unit, said evaporator unit having a pair of discharge openings, first control means for selectively operating said heater and said cooler and second control means cooperable with said first control means for selectively facilitating the discharge of hot air from a first of said evaporator discharge openings and the discharge of cold air from a second of said evaporator discharge openings to provide a combination heater-air conditioner for said vehicle.

9. A heater-air cooling apparatus for automotive vehicles comprising an air receiving and discharging housing adapted to be arranged in the passenger compartment of a vehicle, having a pair of air discharge openings and an air inlet opening, a second air receiving and discharging housing having an air inlet opening and an air outlet opening, an evaporator core of a refrigeration apparatus disposed in the first housing intermediate the discharge openings thereof, a heater core disposed in said second housing in the air flow between the inlet and outlet openings thereof, fresh air and recirculating air ducting connected to the inlet opening of second housing for air communication therewith, an air duct connected between the housing in air communication with the inlet opening of the first housing and outlet opening of said second housing, an air flow control gate in the first housing positionable to direct air either through the evaporator core for subsequent discharge from one of the discharge openings of the first housing during an air cooling cycle of operation of the apparatus or to inhibit air passage through the evaporator core while permitting air flow through the other discharge opening of the first housing.

10. An apparatus according to claim 9 wherein the fresh and recirculating air ducting includes a first and a second duct adapted to extend in air communication from a point exterior of the passenger compartment to a point inside the passenger compartment, a branch duct connected intermediate the length of the first of said ducts and the inlet opening of said first housing, a branch duct connected intermediate the length of the second of said ducts and the inlet of said second housing, and valve means arranged near the junction of said ducts, positionable to provide for either recirculated or fresh air delivery to said second housing.

References Cited in the file of this patent

UNITED STATES PATENTS

| | | |
|---|---|---|
| 2,232,587 | Brandt | Feb. 18, 1941 |
| 2,260,900 | Henney | Oct. 28, 1941 |
| 2,264,848 | Kahl | Dec. 2, 1941 |
| 2,336,089 | Gould | Dec. 7, 1943 |
| 2,391,408 | Galomb et al. | Dec. 25, 1945 |
| 2,518,356 | Mieras et al. | Aug. 8, 1950 |
| 2,598,397 | Levine | May 27, 1952 |
| 2,749,829 | Simons | June 6, 1956 |
| 2,755,072 | Kreuttner | July 18, 1956 |
| 2,755,726 | Little | July 24, 1956 |
| 2,760,347 | Dolza | Aug. 28, 1956 |
| 2,780,077 | Jacobs | Feb. 5, 1957 |